US009665872B2

(12) United States Patent
Sugiyama et al.

(10) Patent No.: US 9,665,872 B2
(45) Date of Patent: May 30, 2017

(54) SERVER APPARATUS, INFORMATION PROVIDING PROGRAM, RECORDING MEDIUM RECORDING INFORMATION PROVIDING PROGRAM, INFORMATION PROVIDING METHOD, TERMINAL DEVICE, TERMINAL PROGRAM AND RECORDING MEDIUM RECORDING TERMINAL PROGRAM

(75) Inventors: Mari Sugiyama, Shinagawa-ku (JP); Hiroyuki Tokunaga, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 837 days.

(21) Appl. No.: 13/510,418

(22) PCT Filed: Mar. 11, 2011

(86) PCT No.: PCT/JP2011/055775
§ 371 (c)(1),
(2), (4) Date: May 17, 2012

(87) PCT Pub. No.: WO2011/115010
PCT Pub. Date: Sep. 22, 2011

(65) Prior Publication Data
US 2012/0233017 A1    Sep. 13, 2012

(30) Foreign Application Priority Data
Mar. 18, 2010    (JP) .................... 2010-062414

(51) Int. Cl.
*G06Q 30/06*    (2012.01)
*G06Q 30/02*    (2012.01)
*G06Q 30/08*    (2012.01)

(52) U.S. Cl.
CPC .................... *G06Q 30/02* (2013.01)

(58) Field of Classification Search
CPC .................... G06Q 30/06; G06Q 30/08
(Continued)

(56) References Cited

U.S. PATENT DOCUMENTS 5,948,040 A * 9/1999 DeLorme et al. ............ 701/426
8,214,241 B2 * 7/2012 Kaiser .................... G06Q 10/02
705/7.11

(Continued)

FOREIGN PATENT DOCUMENTS

JP    2002-024124 A    1/2002
JP    2002-259763 A    9/2002
(Continued)

OTHER PUBLICATIONS

Click ahead seating Gives Patrons the Power to Add Their Names to Restaurant Wait Lists Online, New LRS Website Offers Restaurant Searches, Viewing of Wait Times and Call-Ahead Seating with the Click of a Mouse, Dallas—Jul. 2004, downloaded from www.archive.org on Oct. 9, 2013. (NPL in U.S. Appl. No. 13/327,994) 6 pages.*

(Continued)

*Primary Examiner* — James Zurita
(74) *Attorney, Agent, or Firm* — Sughrue Mion, PLLC

(57) ABSTRACT

Provided is a server apparatus capable of flexibly providing provision information of a store in accordance with a time range when the store can be used by a user. The server apparatus, on the basis of store information including at least any one of position information of a store which provide a product or service, use time information of the store and attribute information of the store, and user time range information user time range information indicating a vacant time range of a user, determines a combination in which the user can use the stores within the time range indicated by the user time range information, and transmits the provision (Continued)

| STORE NAME | ATTRIBUTE INFORMATION | USE TIME INFORMATION ||||| STORE TIME RANGE INFORMATION |
|---|---|---|---|---|---|---|---|
| | | TIME ZONE FROM OPENING OF STORE TO CLOSING OF STORE | USE TIME ZONE PER GENERATION || USE TIME (DURATION) PER SEX || |
| AAA | BEAUTY | AM10:00–PM10:00 | 10'S | PM3:00–5:00 | MALE | 30 MINUTES | PM1:00–PM6:00 |
| | | | 20'S | PM5:00–7:00 | FEMALE | 2 HOURS | |
| | | | 30'S | PM7:00–9:00 | | | |
| | | | 40'S | PM9:00–11:00 | | | |
| | | | 50'S | PM8:00–10:00 | | | |
| | | | 60'S | AM10:00–12:00 | | | |
| | | | AVERAGE | ...... | | | |
| BBB | ACCESSORY | PM3:00–PM10:00 | 10'S | PM3:00–5:00 | | | 2 HOURS FROM PM 4:00 |
| | | | 20'S | PM7:00–9:00 | | | |
| | | | 30'S | PM9:00–11:00 | | | |
| | | | 40'S | PM9:00–11:00 | | | |
| | | | 50'S | PM8:00–10:00 | | | |
| | | | 60'S | AM10:00–12:00 | | | |
| | | | AVERAGE | ...... | | | | information of the store in the determined combination to a terminal device of the user.

24 Claims, 10 Drawing Sheets

(58) Field of Classification Search
USPC .............................................. 705/26.1, 27.1
See application file for complete search history.

(56) References Cited

U.S. PATENT DOCUMENTS

| | | |
|---|---|---|
| 2003/0005056 A1 | 1/2003 | Yamamoto et al. |
| 2004/0128066 A1 | 7/2004 | Kudo et al. |
| 2005/0044077 A1 | 2/2005 | Shibata |

FOREIGN PATENT DOCUMENTS

| | | |
|---|---|---|
| JP | 2003-006543 A | 1/2003 |
| JP | 2003-203084 A | 7/2003 |
| JP | 2005-301911 A | 10/2005 |
| JP | 2009-217397 A | 9/2009 |
| JP | 2010-055027 A | 3/2010 |
| WO | 03/014670 A1 | 2/2003 |
| WO | 03/079230 A1 | 9/2003 |

OTHER PUBLICATIONS

International Search Report of PCT/JP2011/055775 dated Jun. 14, 2011.

Japanese Patent Office Action for JP 2012-505647 dated Jun. 13, 2012 and English-language translation thereof.

* cited by examiner

FIG. 4

321
USER INFORMATION DB
| |
|---|
| User ID |
| Password |
| Credit card number |
| Name |
| Sex |
| Age |
| Address |
| Postal code |
| Telephone number |
| Mail address |
| Use history information |
| ..... |

(A)

322
MAP DB
| |
|---|
| Map image data |
| Longitude and latitude of each point, Address |
| ..... |

(B)

323
STORE INFORMATION DB
| |
|---|
| Store ID |
| Store name |
| Address |
| Postal code |
| Telephone number |
| Mail address |
| Longitude and latitude |
| Attribute information |
| Use time information |
| ..... |

(C)

324
PROVISION INFORMATION DB
| |
|---|
| Store ID |
| Provision information |
| ..... |

| STORE NAME | ATTRIBUTE INFORMATION | USE TIME INFORMATION | | | | STORE TIME RANGE INFORMATION |
|---|---|---|---|---|---|---|
| | | TIME ZONE FROM OPENING OF STORE TO CLOSING OF STORE | USE TIME ZONE PER GENERATION | | USE TIME (DURATION) PER SEX | |
| AAA | BEAUTY | AM10:00–PM10:00 | 10'S | PM3:00–5:00 | MALE 30 MINUTES | PM1:00–PM6:00 |
| | | | 20'S | PM5:00–7:00 | FEMALE 2 HOURS | |
| | | | 30'S | PM7:00–9:00 | | |
| | | | 40'S | PM9:00–11:00 | | |
| | | | 50'S | PM8:00–10:00 | | |
| | | | 60'S | AM10:00–12:00 | | |
| | | | AVERAGE | ...... | | |
| BBB | ACCESSORY | PM3:00–PM10:00 | 10'S | PM3:00–5:00 | | 2 HOURS FROM PM 4:00 |
| | | | 20'S | PM7:00–9:00 | | |
| | | | 30'S | PM9:00–11:00 | | |
| | | | 40'S | PM9:00–11:00 | | |
| | | | 50'S | PM8:00–10:00 | | |
| | | | 60'S | AM10:00–12:00 | | |
| | | | AVERAGE | ...... | | |

FIG. 7

USER SPECIFYING SCREEN

1. SPECIFY TIME RANGE /51

51a—◉ TIME LENGTH [3] h /51b
51c—○ TIME ZONE  [12] mo. [10] day [18] hr. [00] min FROM /51d
                 [12] mo. [10] day [21] hr. [00] min TO
51e—○ FROM SCHEDULE INFORMATION

2. SPECIFY MOVING AREA /52

52a—◉ USE CURRENT POSITION OF USER AS REFERENCE
52b—○ SPECIFY MOVING AREA  AREA SEARCH /52c
52d—○ MOVING AREA IS NOT LIMITED IN PARTICULAR

3. SPECIFY PURPOSE/THEME/GENRE /53

☑ PURPOSE [    ] /53a
☑ THEME   [    ] /53b
☐ GENRE   [    ] /53c (SUBMIT) /54

SERVER APPARATUS, INFORMATION PROVIDING PROGRAM, RECORDING MEDIUM RECORDING INFORMATION PROVIDING PROGRAM, INFORMATION PROVIDING METHOD, TERMINAL DEVICE, TERMINAL PROGRAM AND RECORDING MEDIUM RECORDING TERMINAL PROGRAM

CROSS REFERENCE TO RELATED APPLICATIONS

This application is a National Stage of International Application No. PCT/JP2011/055775 filed Mar. 11, 2011, claiming priority based on Japanese Patent Application No. 2010-062414 filed Mar. 18, 2010, the contents of all of which are incorporated herein by reference in their entirety.

TECHNICAL FIELD

The present invention relates to field of a technique of providing provision information of stores, to user terminals using a network.

BACKGROUND ART

Conventionally, a technique is known of distributing electronic coupons for benefits such as discounts of products or services, to user terminals using a network. For example, Patent Document 1 discloses a technique of downloading an electronic coupon issued by an electronic coupon management apparatus to a potable terminal such as a cell phone (mobile phone) or a PDA used by a user. This electronic coupon is useful information provided for the user.

CITATION LIST

Patent Document

Patent Document 1: Japanese Patent Application Laid-Open No. 2003-006543

SUMMARY OF INVENTION

Problem to be Solved by Invention

Meanwhile, according to the prior art as described above, it is possible to easily provide provision information such as electronic coupons provided from multiple stores, to user terminals.

However, the prior art has difficulty in flexibly providing provision information of stores with respect to a vacant time range in which the user can use (utilize) a store.

The present invention has been made in terms of the above problem, and it is an object of the present invention to provide a recording medium recording an information providing program, an information providing method, a terminal device, a terminal program and a recording medium recording the terminal program, etc., capable of flexibly providing store's provision information matching a time range when a store can be used by a user.

Means for Solving Problem

In order to achieve above problem, an aspect of the invention is a server apparatus to which a terminal device is accessible via communication unit, comprises a time range information acquiring means that acquires user time range information indicating a vacant time range of a user; a store combination determining means that determines a combination of stores which the user can use within a time range indicated by the user time range information based on store information of each of stores which provide a product or service and the acquired user time range information, the store information including at least any one of position information of a store, use time information of the store and attribute information of the store, and the store information being stored in store information storing means that stores provision information of the stores per store; and a provision information transmitting means that transmits the provision information of the stores in the determined combination, to the terminal device.

According to this aspect of the invention, it is possible to flexibly provide provision information of the store matching the time range in which the user can use the store, to the user.

An aspect of the invention has features that in the store information storing means further stores store time range information indicating a vacant time range of the store, and the store combination determining means determines the combination of the stores having the vacant time range of the store which at least partially overlaps the vacant time range of the user, based on the vacant time range of the user indicated by the acquired user time range information and the vacant time range of the store indicated by the store time range information.

According to this aspect of the invention, it is possible to match the vacant time of the user and the vacant time of the store, and flexibly provide provision information which is easier for the user to use.

An aspect of the invention further comprises an attribute information acquiring means that acquires attribute information of the user; and a use time information setting means that sets the use time information of the stores based on the acquired attribute information, wherein the store combination determining means determines the combination of the stores which the user can use within the time range, based on the acquired user time range information and the set use time information of the stores.

According to this aspect of the invention, it is possible to determine the combination of the stores including the store matching the user's attribute and, consequently, the user can use a plurality of stores matching the user's attribute in the time range.

An aspect of the invention further comprises a use history information acquiring means that acquires use history information of a store which the user uses in a past; and a use time information setting means that sets the use time information of the stores, based on the acquired use history information, wherein the store combination determining means determines the combination of the stores which the user can use within the time range, based on the acquired user time range information and the set use time information of the stores.

According to this aspect of the invention, it is possible to determine the combination of stores including the store matching the past history of the user and, consequently, in the vacant time range of the user, the user can preferentially use a plurality of stores which the user used in the past.

An aspect of the invention further comprises a schedule information acquiring means that acquires schedule information of the user, wherein the time range information acquiring means acquires the user time range information satisfying a predetermined condition, from the acquired schedule information at a predetermined timing.

According to this aspect of the invention, it is possible to provide provision information of the store matching the time range in which the user can use the store, to the user in a more timely manner.

An aspect of the invention further comprises a position information acquiring means that acquires position information of the user from the terminal device, wherein the store combination determining means determines the combination of the stores which the user can use within the time range, based on the acquired user time range information, the acquired position information of the user and the position information of the stores.

According to this aspect of the invention, it is possible to determine the combination of the stores including the store for which the current position of the user is taken into account and, consequently, the user can use the store which is easier to go from now in the time range.

An aspect of the invention further comprises an area information acquiring means that acquires area information indicating an area in which the user moves, wherein the store combination determining means determines the combination of the stores which the user can use within the time range, based on the acquired user time range information, the acquired area information and the position information of the stores.

According to this aspect of the invention, it is possible to determine the combination of the stores including a store for which the area specified by the user is taken into account and, consequently, the user can use a plurality of stores in an area which the user wants to get around from now in the time range.

An aspect of the invention further comprises a use condition information acquiring means that acquires use condition information comprising at least one of a purpose, a theme and a genre that the user uses a plurality of stores, wherein the store combination determining means determines the combination of the stores which the user can use within the time range, based on the acquired user time range information, the acquired use condition information and the attribute information of the stores. According to this invention, it is possible to determine a the combination of the stores including a store matching at least one of the purpose, theme and genre specified by the user and, consequently, the user can use a plurality of stores matching user's preference in the time range.

An aspect of the invention further comprises a departure store information acquiring means that acquires departure store information indicating a store which the user wishes to use first within the time range, wherein the store combination determining means determines the combination of the stores including the store indicated by the acquired departure store information as a departure store. According to this invention, it is possible to determine a combination of stores including the store to which the user wants to go first as a departure store and, consequently, the user can use from the store to which the user wants to go first in the time range.

An aspect of the invention has features that the store combination determining means redetermines a combination of the stores which the user can use within a remaining time of the time range after a predetermined time passes, and the provision information transmitting means transmits provision information of the stores in the redetermined combination, to the terminal device of the user. According to this invention, even when the user uses one or more stores of provision information, whereby time then passes and the situation such as the current position of the user changes, it is possible to more flexibly provide provision information of the store matching the remaining time, to the user.

An aspect of the invention further comprises a use recognizing means that recognizes use of the provision information of the stores in the determined combination; and a remaining time calculating means that calculates the remaining time based on the recognized use time and the time range, wherein the store combination determining means redetermines the combination of the stores which the user can use within the remaining time at a timing of calculating the remaining time. According to this invention, it is possible to more flexibly provide provision information of the store matching the remaining time at a timing of calculating the remaining time, to the user.

In an aspect of the invention the provision information is benefit information indicating a benefit which the user gets from the stores. According to this invention, since the user can get a benefit such as a discount upon payment for a product or service at the store, the user increases motivation of using a store, consequently, the store can attract more customers.

An aspect of the invention is an information providing program (computer-readable program) for causing a computer included in a server apparatus to which a terminal device is accessible via communication unit, to function as: a time range information acquiring means that acquires user time range information indicating a vacant time range of a user; a store combination determining means that determines a combination of stores which the user can use within a time range indicated by the user time range information based on store information of each of stores which provide a product or service and the acquired user time range information, the store information including at least any one of position information of a store, use time information of the store and attribute information of the store, and the store information being stored in store information storing means that stores provision information of the stores per store; and a provision information transmitting means that transmits the provision information of the stores in the determined combination, to the terminal device.

An aspect of the invention is a recording medium recording an information providing program for causing a computer included in a server apparatus to which a terminal device is accessible via communication unit, to function as: a time range information acquiring means that acquires user time range information indicating a vacant time range of a user; a store combination determining means that determines a combination of stores which the user can use within a time range indicated by the user time range information based on store information of each of stores which provide a product or service and the acquired user time range information, the store information including at least any one of position information of a store, use time information of the store and attribute information of the store, and the store information being stored in store information storing means that stores provision information of the stores per store; and a provision information transmitting means that transmits the provision information of the stores in the determined combination, to the terminal device.

In an aspect of the invention is an information providing method in a server apparatus to which a terminal device is accessible via communication unit, comprises a step of, at the server apparatus, acquiring user time range information indicating a vacant time range of a user; a step of, at the sever apparatus, determining a combination of stores which the user can use within a time range indicated by the user time range information based on store information of each of stores which provide a product or service and the acquired user time range information, the store information including at least any one of position information of a store, use time information of the store and attribute information of the store, and the store information being stored in store information storing means that stores provision information of the stores per store; and a step of, at the server apparatus, transmitting the provision information of the stores in the determined combination, to the terminal device.

An aspect of the invention comprises a store information acquiring means that acquires store information including at least one of position information of stores which provide a product or service, use time information of the stores and attribute information of the stores, per store from a server apparatus via communication unit; a time range information acquiring means that acquires user time range information indicating a vacant time range of a user; a store combination determining means that determines a combination of the stores which the user can use within a time range indicated by the user time range information, based on the acquired user time range information and the acquired store information of each of the stores; and a display control means that displays provision information of the stores in the determined combination.

An aspect of the invention is a terminal processing program (computer-readable program) for causing a computer included in a terminal device to function as: a store information acquiring means that acquires store information including at least one of position information of stores which provide a product or service, use time information of the stores and attribute information of the stores, per store from a server apparatus via communication unit; a time range information acquiring means that acquires user time range information indicating a vacant time range of a user; a store combination determining means that determines a combination of the stores which the user can use within a time range indicated by the user time range information, based on the acquired user time range information and the acquired store information of each of the stores; and a display control means that displays provision information of the stores in the determined combination.

An aspect of the invention is a recording medium recording a terminal program for causing a computer included in a terminal device to function as: a store information acquiring means that acquires store information including at least one of position information of stores which provide a product or service, use time information of the stores and attribute information of the stores, per store from a server apparatus via communication unit; a time range information acquiring means that acquires user time range information indicating a vacant time range of a user; a store combination determining means that determines a combination of the stores which the user can use within a time range indicated by the user time range information, based on the acquired user time range information and the acquired store information of each of the stores; and a display control means that displays provision information of the stores in the determined combination.

Effect of Invention

According to the present invention, it is possible to flexibly provide provision information of the store matching the time range in which the user can use the store, to the user.

BRIEF DESCRIPTION OF DRAWINGS

FIG. 4 is a view illustrating an example of content registered in various types of databases.

FIG. 5 is a view illustrating an example of attribute information, use time information and store time range information per store.

FIG. 7 is an example of a user specifying screen displayed on the display unit 15.

EMBODIMENT OF INVENTION

Hereinafter, an embodiment of the present invention will be described in details with reference to the drawings. In addition, an embodiment will be described below where the present invention is applied to an information providing system.

[1. Outline of Configuration and Function of Information Providing System]

First, an outline of a configuration and a function of an information providing system S according to the present embodiment will be described using FIG. 1.

Figure 1:
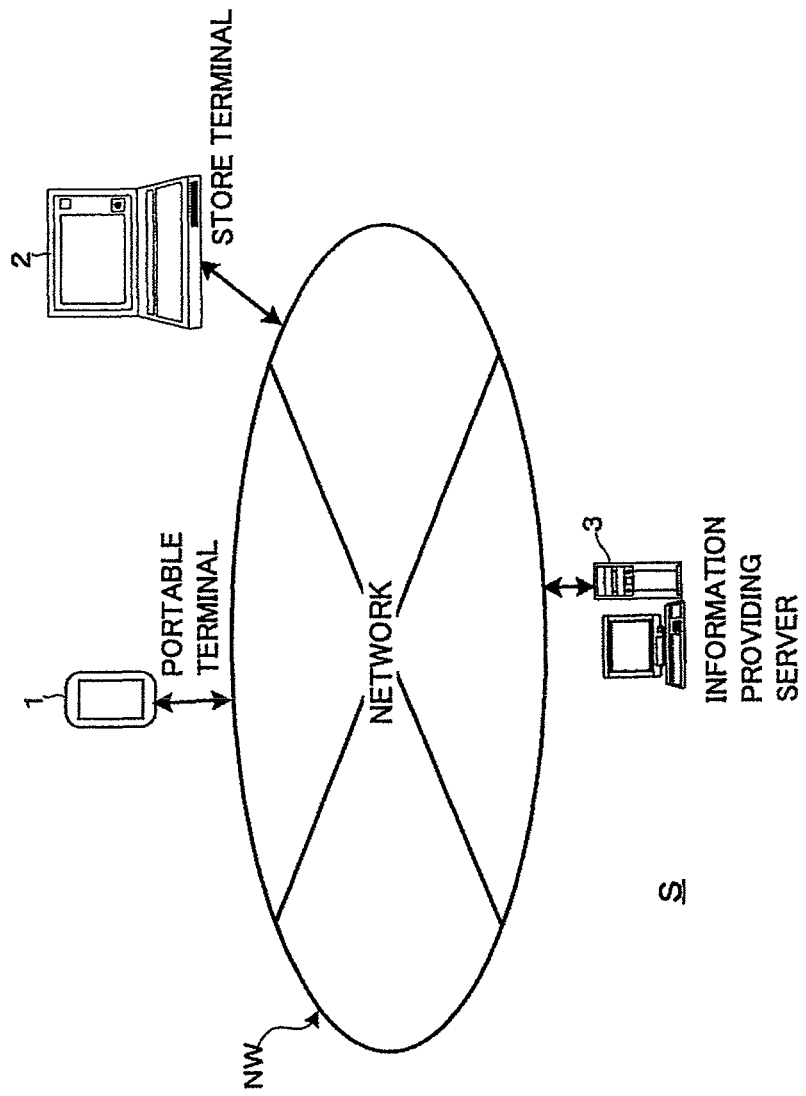
FIG. 1 is a view illustrating an example of a schematic configuration of the information providing system S according to the present embodiment.

FIG. 1 is a view illustrating an example of a schematic configuration of the information providing system S according to the present embodiment. As illustrated in FIG. 1, the information providing system S employs a configuration including a potable terminal 1, a store terminal 2 and an information providing server 3 which the potable terminal 1 and the store terminal 2 is accessible via a network NW which is communication means. In addition, the potable terminal 1 is an example of a terminal device according to the present invention. Further, the information providing server 3 is an example of a server apparatus.

The potable terminal 1 and the information providing server 3, and the store terminal 2 and the information providing server 3 can transmit and receive data to and from each other via (through) the network NW. In addition, the network NW is constructed with, for example, Internet, a dedicated communication line (for example, CATV (Community Antenna Television) line), a potable communication network and a gateway.

[1-1. Outline of Configuration and Function of Mobile Terminal 1]

Figure 2:
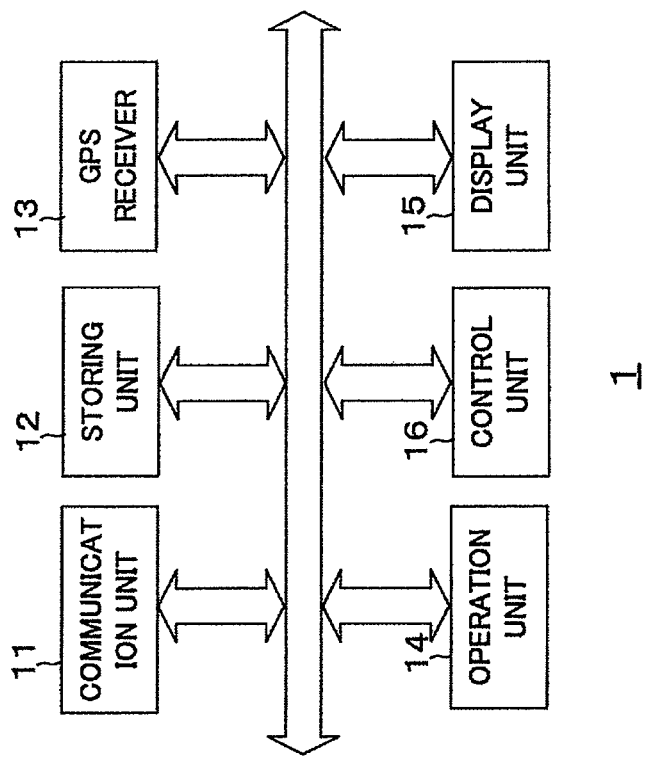
FIG. 2 is a block diagram illustrating a schematic configuration example of the potable terminal 1.

FIG. 2 is a block diagram illustrating a schematic configuration example of the potable terminal 1.

As illustrated in FIG. 2, the potable terminal 1 has, for example, a communication unit 11, a storing unit 12, a GPS (Global Positioning System) receiver 13, an operation unit 14, a display unit 15 and a control unit 16. In addition, for example, a mobile phone, a PDA (Personal Digital Assistant) and a potable game player can be applied to the potable terminal 1.

The communication unit 11 has a communication circuit for connecting to the network NW via a wireless base station.

The storing unit 12 is formed with, for example, a flash memory, and stores an OS (operating system), various application programs (software) and various items of data. This application program (computer-readable program) includes, for example, a terminal program (hereinafter "provision information acquiring and managing program") for acquiring and managing provision information of a store from the information providing server 3, and a program (hereinafter "scheduler") for managing schedule (plan) information of a user of the potable terminal 1. Further, the storing unit 12 stores schedule information registered during execution of the scheduler. In addition, the terminal program according to the present invention may be acquired from, for example, another server apparatus via the network NW, or may be recorded in a recording medium and read via a drive apparatus.

The GPS receiver 13 receives a navigation radio wave outputted from a GPS satellite via an antenna, and detects a current position (for example, longitude and latitude) of the potable terminal 1.

The operation unit 14 receives an operation command from the user. The display unit 15 displays various pieces of information.

The control unit 16 has, for example, a CPU (Central Processing Unit), a RAM (Random Access Memory) and a ROM (Read Only Memory). While the CPU executes the OS, the control unit 16 accesses (for example, connects to based on an IP (Internet Protocol) address or a URL (Uniform Resource Locator)) the information providing server 3 via the communication unit 11 by activating an provision information acquiring and managing program according to a user's operation command. Subsequently, the control unit 16 transmits the information acquisition request including user time range information indicating a time range (in other words, a vacant time range of the user) in which the user can use (utilize) a store, to the information providing server 3 via the network NW. In addition, the information acquisition request also includes a user ID (identification information) for identifying the user of the potable terminal 1. Further, a vacant time range includes a vacant time length indicating a length of time from the current point of time (for example, three hours) in which the user can use the store, and/or a vacant time zone indicating a time zone from what time to what time (for example, 18:00 to 21:00) in which the user can use the store. Furthermore, the time range is, for example, specified by the user through the operation unit 14 or acquired from the schedule information.

Still further, the control unit 16 acquires provision information of each store in a combination of stores determined based on, for example, the user time range information by the information providing server 3 according to the information acquisition request, from the information providing server 3, and displays the provision information on, for example, the display unit 15 (presents to the user).

In addition, a configuration may be employed where, in addition to the user time range information, the control unit 16 includes at least one of position information of the user, area information and use condition information together with user time range information in the information acquisition request as information for making the information providing server 3 determine a combination of stores to transmit to the information providing server 3 via the network NW. Position information of the user is, for example, detected as a current position of the potable terminal 1 by the GPS receiver 13. Further, area information indicates an area (hereinafter, "moving area") in which the user moves (gets around) to use a store, and is, for example, specified by the user through the operation unit 14. Furthermore, use condition information includes at least one of a purpose, a theme and a genre that the user uses a plurality of stores, and is, for example, specified by the user through the operation unit 14.

[1-2. Outline of Configuration and Function of Information Providing Server 3]

Figure 3:
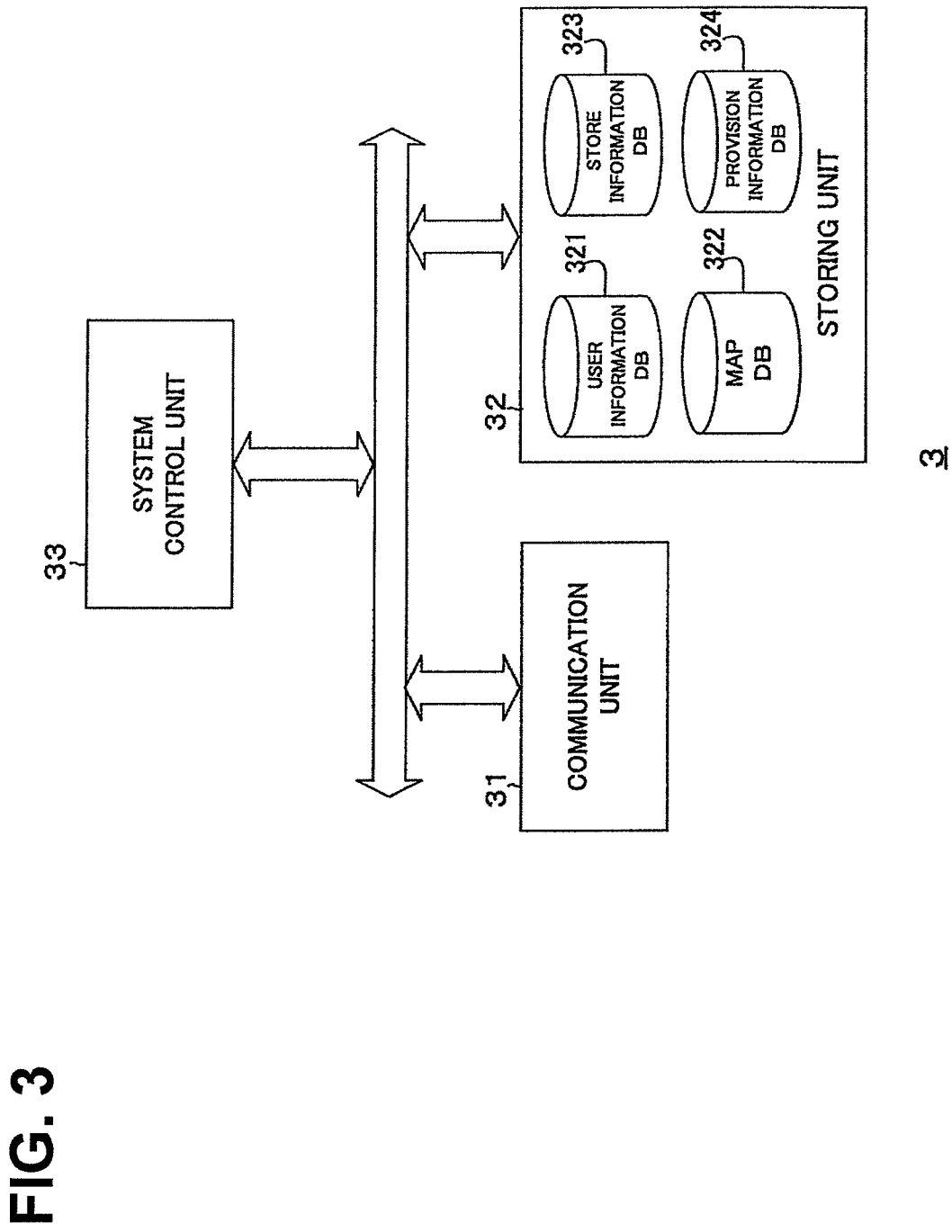
FIG. 3 is a block diagram illustrating a schematic configuration example of the information providing server 3.

FIG. 3 is a block diagram illustrating a schematic configuration example of the information providing server 3.

As illustrated in FIG. 3, the information providing server 3 has, for example, a communication unit 31, a storing unit 32 and a system control unit 33. In addition, the information providing server 3 may employ a configuration including one server or may employ a configuration including a group of a plurality of servers.

The storing unit 32 (an example of storing means) employs a configuration including, for example, a hard disc drive, and stores an OS, various programs (an information providing program and a Web server program according to the present invention) and various items of data. In addition, the information providing program according to the present invention may be acquired from, for example, another apparatus via the network NW, or may be recorded in a recording medium and read via a drive apparatus.

Further, in the storing unit 32, a user information database (DB) 321, a map database (DB) 322, a store information database (DB) 323 and an provision information database (DB) 324 are constructed.

FIG. 4 is a view illustrating an example of content registered in various types of databases. In the user information database 321 illustrated in FIG. 4(A), user information such as a user ID, a password, a credit card number, a name, the sex, the age, an address (an address of a user's working place is also fine), a postal code, a telephone number, an electronic mail address and use history information of a user registered as a member is associated per user and registered (stored). Meanwhile, a user ID, a password, a credit card number, a name, the sex, the age, an address, a telephone number and an electronic mail address are registered by accessing the information providing server 3 from, for example, the potable terminal 1 and finishing member registration procedure. In addition, the sex and the age are an example of user attribute information.

Further, use history information includes a use history such as a store ID (identification information for identifying a store) of a store which the user used in the past (purchased a product or receives service), a use time and information related to payment. This use history information is, for example, registered by payment processing executed by the information providing server 3 upon payment at a store which the user used. Further, information related to payment includes, for example, information such as a type of payment (pay) and a product ID of a purchased product. Meanwhile, the type of payment includes, for example, payment using a credit card (hereinafter "credit card payment"), payment using electronic money (hereinafter "electronic money payment") or payment using a coupon (hereinafter "coupon payment"). In addition, electronic money payment includes online payment (a system of connecting a host computer of an electronic money service company and a store terminal online and executing payment), and off-line payment (a system of executing payment off-line by means of, for example, a potable terminal on which an IC chip storing electronic money is mounted or an IC card and a store terminal). Further, a coupon includes a coupon (electronic coupon) configured with electronic data, or a coupon formed with a paper medium. This coupon has a value of money similar to electronic money, and can be used for payment using only this coupon or payment using cash, a credit card and electronic money in combination.

In the map database 322 illustrated in FIG. 4(B), map data representing a map is registered. Map data includes map image data showing, for example, facilities such as stores, land sections (administration sections) and streets, and information such as the longitude and the latitude of each point on a map image, an address and a postal code.

In the store information database 323 illustrated in FIG. 4(C), store information such as a store ID, a store name, an address, a postal code, a telephone number, an electronic mail address, a longitude and a latitude, attribute information and use time information of a store which provides a product or service is associated per store and registered. Meanwhile, the longitude and the latitude of a store, an address or a postal code is an example of position information of the store. Further, attribute information of a store includes, for example, aesthetics, manicure, Japanese food, Western food, clothes, shoes, bags, accessories, jewelry, games, books, home electrical appliance, golf, mobile phones, rental DVDs, healing, beauty, diet, shopping, gourmet, men's, women's and unavailable for minors. In addition, attribute information of a store is a keyword representing a store, and is set on a store side.

Further, use time information includes, for example, a time range in which the user can use, or a use time (duration) in case of a store which provides service. A time range in which the user can use is, for example, a time length from a given point of time (a point of time when, for example, the information providing server 3 receives an information acquisition request from the potable terminal 1), or a time zone from what time to what time. A time range in which the user can use a store is, for example, a time zone from opening of the store to closing of the store, a use time zone per generation and a use time per sex. The use time zone per generation and the use time per sex are set by the use history of the user having the attribute or preliminary survey by a store. Use time information indicating this time range is, for example, uploaded upon member registration by a store from a store terminal to the information providing server 3 or upon preliminary survey, and is registered in the store information database 323.

Further, in the store information database 323 illustrated in FIG. 4(C), store time range information indicating a vacant time range of a store is associated per store and registered. The vacant time range of a store is a time range which fluctuates according to a day and a time. The vacant time range of a store is a time zone other than a time zone in which a store has difficulty in serving due to congestion in a time zone from opening of the store to closing of the store. An example where a store has difficulty in serving due to congestion is, for example, a case where service is fully reserved and store staffs cannot serve or a case where a space cannot be secured. A service reservation situation is, for example, managed by a store terminal, and a vacant time range of the store is calculated from this reservation situation. Store time range information indicating the vacant time range calculated in this way is, for example, uploaded from the store terminal to the information providing server 3 on a regular basis or upon reception of reservation, and is registered in the store information database 323. Further, store time range information indicating the vacant time range of a store may be partitioned per, for example, sex. For example, when reservation is fully made by female customers and reservation is scarcely made by male customers between 13:00 and 18:00, information indicating male customers is added to store time range information showing a vacant time range of the store (13:00 to 18:00) (in other words, there is no vacant time range for female customers). In addition, a vacant time range predicted when a store staff recognizes a congested situation in a store may be configured to be sequentially inputted from a store terminal. Alternately, a configuration may be employed where a vacant time range predicted when, for example, a store terminal recognizes a congested situation from an image capturing an inside of a store by means of a camera is sequentially calculated. Store time range information indicating the vacant time range inputted or calculated in this way is uploaded from the store terminal to the information providing server 3 at a timing when, for example, the vacant time range is inputted or calculated, and is registered in the store information database 323. By this means, it is possible to register store time range information in the store information database 323 in real time.

FIG. 5 is a view illustrating an example of attribute information, use time information and store time range information per store. With the example illustrated in FIG. 5, use time information of a store AAA which provides beauty service includes a time zone from opening of the store to closing of the store, a use time zone per generation and a use time (duration) per sex. Further, store time range information of the store AAA includes a vacant time range of the store AAA. Meanwhile, the vacant time range of the store AAA is calculated from a reservation situation managed by a store terminal. Meanwhile, use time information of a store BBB which sells an accessory includes a time zone from opening of the store to closing of the store, and a use time zone per generation. Further, store time range information of the store BBB includes a vacant time range of the store BBB. Meanwhile, the vacant time range of the store BBB is inputted by a store staff. In addition, for a store for which a vacant time range is not included, a time zone from opening of the store to closing of the store is processed as a vacant time range.

In the provision information database 324 illustrated in FIG. 4(D), a store ID and provision information are associated per store and registered. Meanwhile, an example of provision information of the store includes, for example, benefit information, guide information and recommend information. Benefit information is an electronic coupon (configured with, for example, image data or text data) showing a benefit which the user can get from a store upon payment of, for example, a product or service. This benefit is, for example, a discount from a product sales price or a service offer price, and, in this case, benefit information includes a discount rate (10% discount of the price) or a discount amount. In addition, a benefit for a free product or service is also provided. Further, benefit information is used when, for example, credit card payment, electronic money payment or coupon payment is executed. Furthermore, guide information includes content and a price of a product or service provided (sold) at a store and a way to the store. Still further, recommend information includes recommend information of a product or service provided by a store.

The system control unit 33 employs a configuration including, for example, a CPU, a ROM and a RAM. Further, when the CPU reads and executes various programs stored in the ROM or the storing unit 32, the system control unit 33 functions as, for example, time range information acquiring means, store combination determining means, provision information transmitting means, position information acquiring means, area information acquiring means, use condition information acquiring means, attribute information acquiring means, use history information acquiring means, use time information setting means, schedule information acquiring means, use recognizing means, remaining time calculating means and departure store information acquiring means, and executes the following processings.

[2. Operation of Information Providing System]

Next, an operation of the information providing system S according to the present embodiment will be described.

(2.1 Operation of Providing Provision Information from Information Providing Server 3 to Mobile Terminal 1)

First, an operation of providing provision information from the information providing server 3 to the potable terminal 1 will be described using, for example, FIG. 6.

Figure 6:
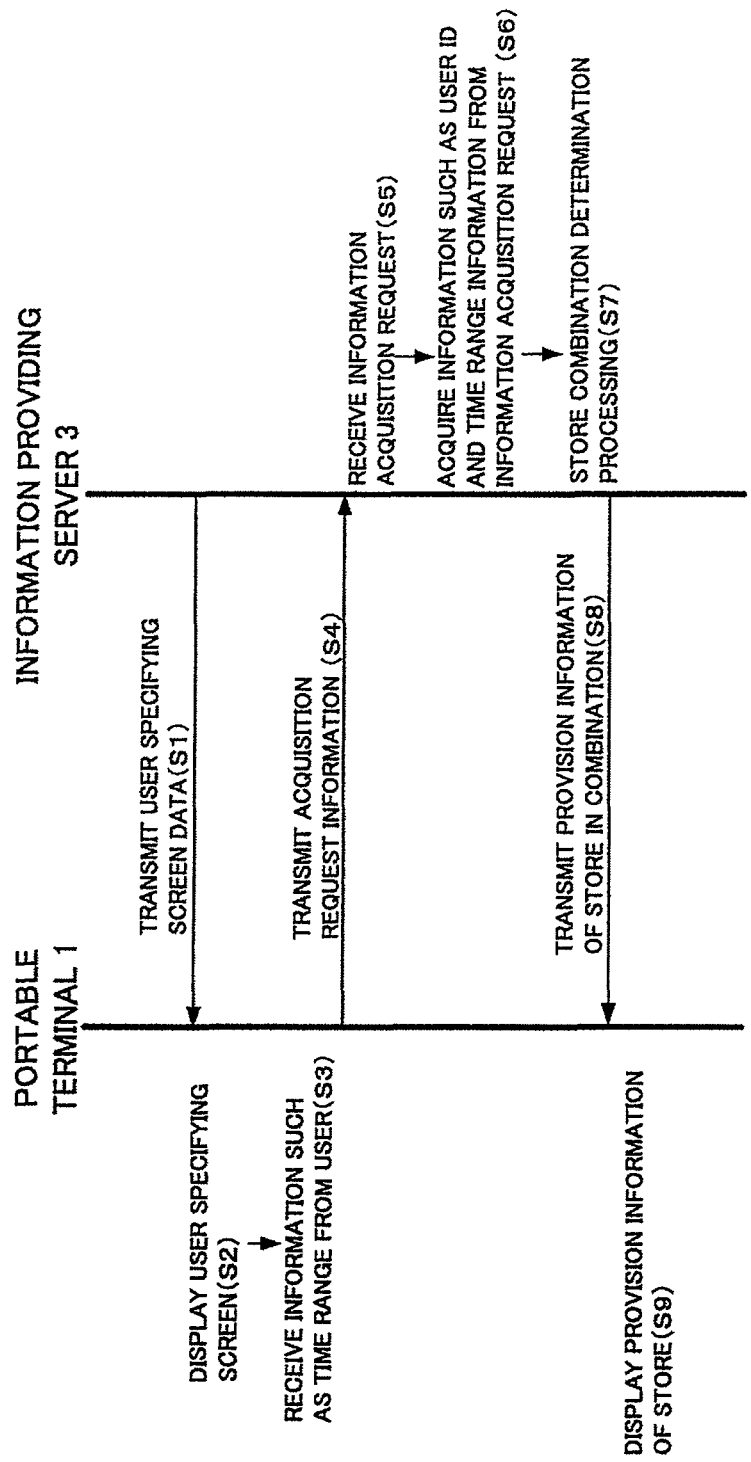
FIG. 6 is a sequence diagram illustrating processing and an exchange of information in and between the potable terminal 1 and the information providing server 3.

FIG. 6 is a sequence diagram illustrating processing and an exchange of information in and between the potable terminal 1 and the information providing server 3.

When an provision information acquiring and managing program is activated in the potable terminal 1 to access the information providing server 3 via the communication unit 11, and the user is authenticated by log-in processing, user specifying screen data is transmitted from the information providing server 3 to the potable terminal 1 (step S1) and is displayed on the display unit 15 (step S2).

Next, the control unit 16 of the potable terminal 1 receives information such as a time range specified by the user through the operation unit 14 as described below, on the user specifying screen displayed on the display unit 15 and stores the information in the RAM (step S3).

FIG. 7 is an example of a user specifying screen displayed on the display unit 15. With an example illustrated in FIG. 7, a time range specifying portion 51, a moving area specifying portion 52 and a purpose/theme/genre specifying portion 53 are provided.

In a state where user specifying screen is displayed as illustrated in FIG. 7, when the user needs to specify the time range by way of a time length from the current time point, the user operates the operation unit 14, checks a radio button 51a in the time range specifying portion 51 and inputs the time length in an input column 51b. By contrast with this, when the user needs to specify the time range by way of the time zone, the user operates the operation unit 14, checks a radio button 51c in the time range specifying portion 51 and inputs the time band in an input column 51d. Meanwhile, when the user needs to acquire the time range from schedule information, the user operates the operation unit 14, and checks a radio button 51e in the time range specifying portion 51.

Further, in a state where the user specifying screen is displayed as illustrated in FIG. 7, when the user wants to specify a moving area based on the current position of the user, the user operates the operation unit 14 and checks the radio button 52a in the moving area specifying portion 52. Meanwhile, when the user wants to specify the moving area, the user operates the operation unit 14, checks the radio button 52b in the moving area specifying portion 52 and specifies a desired area (for example, Shibuya-ward) on a displayed area selecting screen by specifying "area search" 52c to which a hyperlink is attached. In addition, a configuration may be employed where the moving area is specified by selecting a range desired by the user on a map displayed on the area selecting screen, using a mouse. Further, a configuration may be employed where, when the display unit 15 is a touch panel, the moving area is specified by tracing the outline of the desired range on a map, using the finger or a pen. Meanwhile, when the moving area is not limited in particular, the user checks the radio button 52d in the moving area specifying portion 52.

Further, in a state where the user specifying screen is displayed as illustrated in FIG. 7, the user can input (multiple entries allowed) and specify where necessary at least one of use conditions such as a purpose, a theme and a genre in the input columns 53a to 53c in the purpose/theme/genre specifying portion 53. In addition, a configuration may be employed where these purpose, theme and genre are selected from a list of a purpose, a theme and a genre prepared in advance. Meanwhile, a purpose includes, for example, healing, beauty or diet. Further, the theme includes, for example, shopping or gourmet. Furthermore, the genre includes, for example, books, accessories or home appliance. The purpose, the theme and the genre may overlap each other.

As described above, when the user specifies a transmission button 54 after the user specifies, for example, a time range on the user specifying screen, the control unit 16 of the potable terminal 1 transmits an information acquisition request including user time range information indicating the time range stored in the RAM, to the information providing server 3 via the network NW (step S4).

In addition, when the radio button 51e is checked in the time range specifying portion 51 illustrated in FIG. 7, the control unit 16 of the potable terminal 1 includes schedule (for example, a schedule for several months before and after the current point of time) information stored in the storing unit 12, in the information acquisition request instead of user time range information to transmit to the information providing server 3.

Further, when the radio button 52a is checked in the moving area specifying portion 52 illustrated in FIG. 7, the control unit 16 of the potable terminal 1 includes position information of the user indicating the current position detected by the GPS receiver 13, in the information acquisition request to transmit to the information providing server 3. Meanwhile, when the radio button 52b is checked in the moving area specifying portion 52 illustrated in FIG. 7 and the desired area is selected, the control unit 16 of the potable terminal 1 includes area information indicating the area in the information acquisition request to transmit to the information providing server 3.

Further, when at least one of use conditions of the purpose, the theme and the genre is inputted in the purpose/theme/genre specifying portion 53 illustrated in FIG. 7, the control unit 16 of the potable terminal 1 includes use condition information including the use conditions, in the information acquisition request to transmit to the information providing server 3.

In addition, the user time range information, the schedule information, the area information and the use condition information may be transmitted together with the user ID from, for example, a personal computer other than the potable terminal 1 which the user uses, to the information providing server 3.

Meanwhile, the system control unit 33 of the information providing server 3 receives the information acquisition request transmitted from the potable terminal 1 (step S5). Next, the system control unit 33 acquires a user ID from the information acquisition request, and acquires at least one of user time range information, schedule information, position information of the user, area information and use condition information (step S6).

In addition, when schedule information is acquired from the information acquisition request, the system control unit 33 acquires user time range information satisfying predetermined conditions from the schedule information. For example, a time zone in which a plan is not registered for a predetermined time (two hours) or more until twenty four hours pass from the current time in schedule information is acquired as user time range information. In addition, a configuration may be employed where user time range information satisfying predetermined conditions is acquired from schedule information by the control unit 16 of the potable terminal 1, and the acquired user time range information is included in the information acquisition request and is transmitted to the information providing server 3.

Next, the system control unit 33 performs store combination determining processing of determining a combination of stores which the user can use within a time range indicated by user time range information, based on at least one of information such as user time range information acquired in step S6, position information of each store registered in the store information database 323, use time information of each store and attribute information of each store (step S7).

Figure 8:
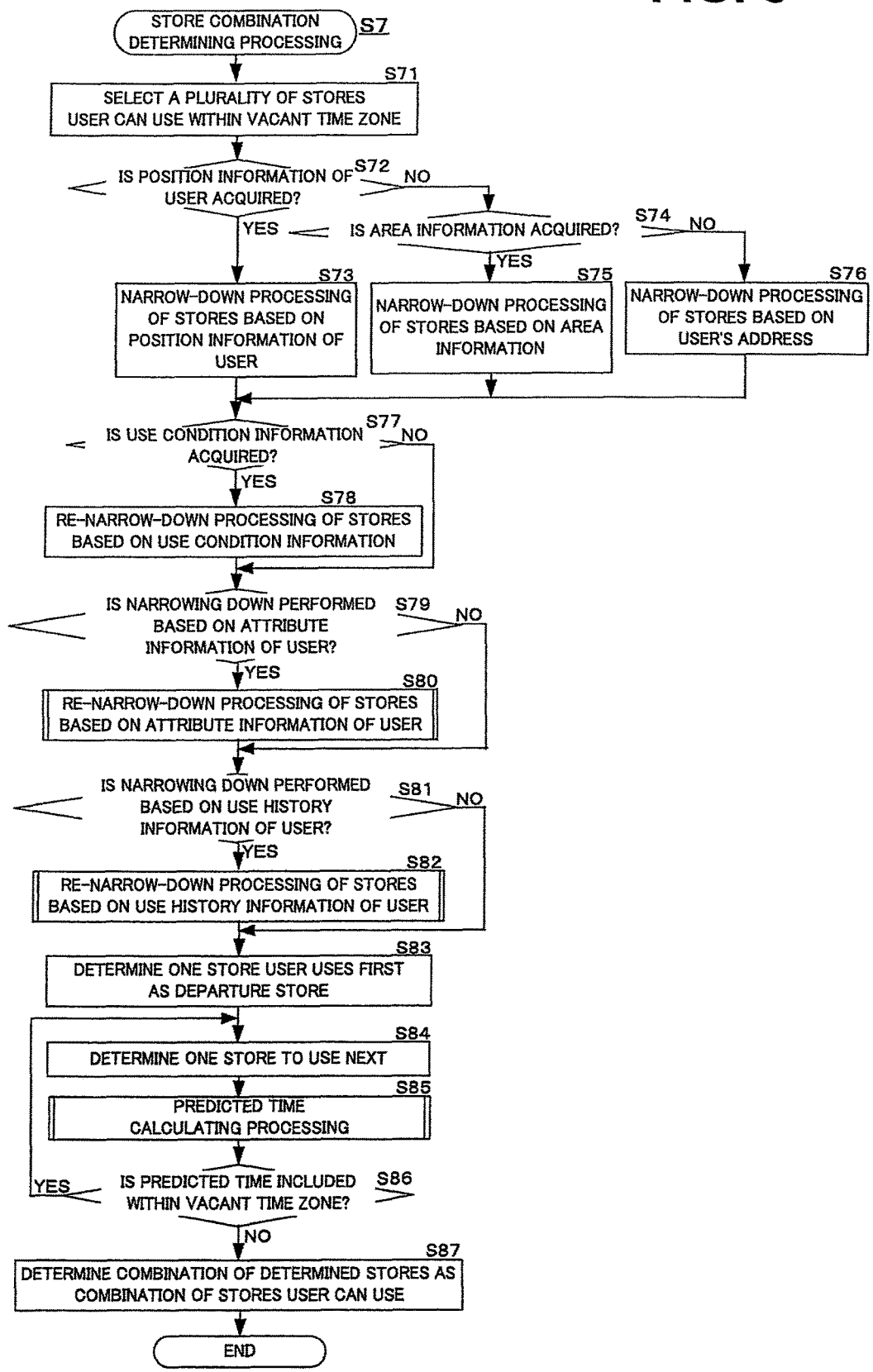
FIG. 8 is a flowchart illustrating an example of store's combination determining processing in step S7 in shown FIG. 6.

FIG. 8 is a flowchart illustrating an example of store combination determining processing in step S7. In processing illustrated in FIG. 8, the system control unit 33 specifies a time zone (hereinafter "a vacant time zone of a user") from a vacant time range (including a vacant time length from the current time or a vacant time zone) indicated by the acquired user time range information, selects a plurality of stores which the user can use within the vacant time zone, from the store information database 323 (selects according to a store ID) (step S71). For example, use time information (time zone from opening of a store to closing of a store) of each store registered in the store information database 323 is referred to, and a store which is open within the vacant time zone is selected. In addition, a store with store hours which partially overlap the vacant time zone of the user is also selected.

Hereinafter, a case where a vacant time range of a store is used will be described as another example of processing in step S71. In this case, the system control unit 33 selects a plurality of stores with vacant time zones which at least partially overlap the vacant time zone of the user, from the store information database 323 based on the vacant time zone of the user and the vacant time zone of the store. The vacant time zone of the store is specified from the vacant time range when the vacant time range of the store is indicated by store time range information registered in the store information database 323. In this case, when, for example, the vacant time zone of the user is "13:00 to 18:00", the store with the vacant time zone "17:00 to 19:00" is selected. Further, information showing the sex is added to store time range information indicating the vacant time range of the store in some cases. In this case, the system control unit 33 acquires attribute information of the user of the potable terminal 1 from the user information database 321, and selects a plurality of stores for which the sex indicated by this attribute information and the sex (for example, male) who is a target of the vacant time range of a store match and which includes a vacant time zone at least partially overlapping a vacant time zone of the user. In addition, when the vacant time range of a store is not indicated by store time range information registered in the store information database 323, a time zone from opening of the store to closing of the store is specified as the vacant time zone of the store.

Next, the system control unit 33 decides whether or not position information of the user is acquired from the information acquisition request (step S72), and, when it is decided that position information of the user is acquired (step S72: YES), the step proceeds to step S73 and, when it is decided that position information of the user is not acquired (step S72: NO), the step proceeds to step S74.

In step S73, the system control unit 33 performs narrow-down processing of a plurality of stores selected in step S71, based on position information of the user and position information of each store registered in the store information database 323. With this narrow-down processing, a plurality of stores selected in step S71 are narrowed down to a store which is (exists) within a predetermined area from a current position (longitude and latitude) indicated by position information of the user based on position information of the store (longitude and latitude, or address or postal code). By this means, it is possible to determine a combination of stores including a store for which the current position of the user is taken into account and, consequently, use a plurality of stores which are easy for the user to go from now in the vacant time range of the user. In addition, the predetermined area is, for example, inside of a range of a circle with predetermined km of a radius around the current position.

Meanwhile, in step S74, the system control unit 33 decides whether or not area information is acquired from the information acquisition request and, when it is decided that the area information is acquired (step S74: YES), the step proceeds to step S75 and, when it is decided that the area information is not acquired (step S74: NO), the step proceeds to step S76.

In step S75, the system control unit 33 performs narrow-down processing of a plurality of stores selected in step S71, based on the area information and position information of each store registered in the store information database 323. With this narrow-down processing, for example, a plurality of stores selected in step S71 are narrowed down to a store located within a moving area indicated by area information, based on position information of the store. By this means, it is possible to determine a combination of stores including a store for which the area specified by the user is taken into account and, consequently, use a plurality of stores in an area in which the user wants to get around from now in the vacant time range of the user.

Meanwhile, in step S76, the system control unit 33 performs narrow-down processing of a plurality of stores selected in step S71, based on an address (an address of a working place of the user is fine) of the user associated with the user ID acquired from the information acquisition request and registered in the user information database 321, and position information of each store registered in the store information database 323. With this narrow-down processing, for example, a plurality of stores selected in step S71 are narrowed down to a store existing within a predetermined area from the address of the user, based on position information of the store. By this means, it is possible to determine a combination of stores including a store for which the address or the working plate of the user is taken into account, and, consequently, the user can use a plurality of stores which are easy for the user to go from home or a working place in the vacant time range of the user. In addition, the predetermined area is, for example, inside of a range of a circle with predetermined km of a radius around the address of the user. Alternately, the predetermined area may be an administrative section (for example, city, town and village) including the address of the user.

Next, in step S77, the system control unit 33 decides whether or not use condition information is acquired from the information acquisition request, and, when it is decided that the use condition information is acquired (step S77: YES), the step proceeds to step S78 and, when it is decided that the use condition information is not acquired (step S77: NO), the step proceeds to step S79.

In step S78, the system control unit 33 performs re-narrow-down processing of a plurality of stores narrowed down in step S73, S75 or S76, based on the use condition information and attribute information of each store registered in the store information database 323. With this re-narrow-down processing, for example, a plurality of stores narrowed down in step S73, S75 or S76 are narrowed down to a store including in attribute information at least one (OR conditions) or all (AND conditions) of the purpose, theme and genre indicated by use condition information. By this means, it is possible to determine a store combination including a store matching at least one of the purpose, theme and genre specified by the user and, consequently, the user can use a plurality of stores matching user's preference in the vacant time range of the user.

Meanwhile, in step S79, the system control unit 33 decides whether or not narrowing down is performed based on attribute information of the user, and, when it is decided that narrowing down is performed based on attribute information of the user (step S79: YES), the step proceeds to step S80 and, when it is decided that narrowing down is not performed based on attribute information of the user (step S79: NO), the step proceeds to step S81. Meanwhile, a configuration may be employed where whether narrowing down is performed based on attribute information of the user is arbitrarily set by an administrator of the information providing server 3, or is arbitrarily set by the user of the potable terminal 1 (for example, set on the user specifying screen provided from the information providing server 3 to the potable terminal 1).

In step S80, the system control unit 33 performs re-narrow-down processing of a plurality of stores narrowed down in step S73, S75, S76 or S78, based on attribute information of the user associated with the user ID acquired from the information acquisition request and registered in the user information database 321 and use time information of each store registered in the store information database 323.

FIG. 9(A) is a flowchart illustrating an example of re-narrow-down processing in step S80. With this re-narrow-down processing, the system control unit 33 first acquires attribute information of the user from the user information database 321 and acquires use time information of each store narrowed down in step S73, S75, S76 or S78, from the store information database 323 (step S801).

Next, the system control unit 33 sets the acquired use time information of each store based on the acquired attribute information of the user (step S802). When, for example, an age is acquired as attribute information of the user, use time information indicating a use time zone (see FIG. 5) matching the generation including the age is set.

Further, the system control unit 33 narrows down a plurality of stores narrowed down in step S73, S75, S76 or S78, to a store with the time within the use time zone indicated by the set use time information included in the vacant time zone of the user (step S803). By this means, it is possible to determine a combination of stores including a store matching user's attributes and, consequently, the user can use a plurality of stores matching the attribute of the user in the vacant time range of the user.

In addition, a configuration may be employed where, in this step S80, a plurality of stores narrowed down as described above are re-narrowed down based on attribute information of the user associated with the user ID acquired from the information acquisition request and registered in the user information database 321 and attribute information of each store registered in the store information database 323. In this case, when, for example, the sex (for example, women) is acquired as attribute information of the user, stores are narrowed down to a store (for example, a store dedicated for women) matching the sex.

Meanwhile, in step S81, the system control unit 33 decides whether or not narrowing down is performed based on use history information of the user, and, when it is decided that narrowing down is performed based on use history information of the user (step S81: YES), the step proceeds to step S82 and, when it is decided that narrowing down is not performed based on use history information of the user (step S81: NO), the step proceeds to step S83. Meanwhile, a configuration may be employed where whether narrowing down is performed based on use history information of the user is arbitrarily set by the administrator of the information providing server 3, or is arbitrarily set by the user of the potable terminal 1 (for example, set on the user specifying screen provided from the information providing server 3 to the potable terminal 1).

In step S82, the system control unit 33 re-narrows down a plurality of stores narrowed in step S73, S75, S76, S78 or S80, based on use history information of the user associated with the user ID acquired from the information acquisition request and registered in the user information database 321. By this means, it is possible to determine a combination of stores including a store matching the past use history of the user and, consequently, the user can preferentially use a plurality of stores which the user used in the past in the vacant time range of the user.

FIG. 9(B) is a flowchart illustrating an example of re-narrow-down processing in step S82. With this re-narrow-down processing, the system control unit 33 first acquires all pieces of use history information of the user from the user information database 321, and specifies stores (that is, stores used by the user in the past) including the store IDs in the acquired use history information, from a plurality of stores narrowed down in step S73, S75, S76, S78 or S80 (step S821).

Next, the system control unit 33 sets use time information of the store (that is, a use time included in use history information) based on use history information including a store ID of the specified store (step S822).

Further, the system control unit 33 narrows down a plurality of specified stores to a store with a use time indicated by the set use time information included in the vacant time zone of the user (step S823).

Meanwhile, in step S83, the system control unit 33 determines one store which the user first uses (goes to first), from a plurality of stores narrowed down in step S73, S75, S76, S78, S80 or S82 as a departure store. For example, the system control unit 33 calculates a linear distance between the current position of the user (an address is also fine) and the position of each store or a distance connecting the current position of the user (an address is also fine) and the position of each store along a street, using map data registered in the map database 322. Further, the system control unit 33 determines a store closest (the distance is shortest) to the current position of the user, based on the calculated distance. By this means, it is possible to determine a combination of stores including a store for which the current position of the user is taken into account as a departure store and, consequently, it is possible to use a store which is easy for the user to go from now. In addition, a configuration may be employed where a departure store is determined at random from a plurality of stores.

Further, a configuration may be employed as another example of step S83 where a store specified by the user of the potable terminal 1 is determined as a departure store. In this case, for example, the user can specify a store which the user wishes to use first within the vacant time range of the user, on the user specifying screen illustrated in FIG. 7 provided from the information providing server 3 to the potable terminal 1, and departure store information indicating the store is included in the information acquisition request and transmitted to the information providing server 3. Further, the system control unit 33 acquires departure store information from the information acquisition request, and determines a store indicated by this departure store information as a departure store. By this means, it is possible to determine a combination of stores including the store to which the user wants to go first as a departure store and, consequently, the user can use the store to which the user wants to go first in the vacant time range of the user.

Next, the system control unit 33 determines one store to use next, from a plurality of stores narrowed down in step S73, S75, S76, S78, S80 or S82 (step S84). For example, the store closest (the distance is shortest) to a store determined immediately before is determined (determined according to the same procedure as in step S83), from position information of the store determined immediately before (the store determined in step S83 or step S84 immediately before according to a loop), position information of each of other stores and map data. In addition, a configuration may be employed where a store to use next is determined at random from a plurality of stores.

Next, the system control unit 33 performs processing of calculating a predicted time when use of a store determined immediately before is finished (step S85).

FIG. 9(C) is a flowchart illustrating an example of predicted time calculating processing in step S85. With this predicted time calculating processing, the system control unit 33 adds the distance (the distance calculated in step S83) between the current position of the user and the departure store and the distance (the distance calculated in step S84) between the departure store and a store to use next (the distance calculated in step S84) to calculate the total distance (the moving distance of the user) (step S851). In addition, to this total distance, a distance from the store to use next to the store to use thereafter is added when the step returns from step S86 to step S84. Further, when position information indicating the current position of the user is not acquired from the potable terminal 1, the distance from the address of the user to the departure store or the distance set as default (a distance including a margin) instead of the distance from the current position of the user to the departure store is added to the total distance.

Next, the system control unit 33 calculates a moving time of the user from the calculated total distance and the moving speed set as default (step S852). In addition, in case of, for example, a distance (a predetermined distance or less) in which the user can move on foot, an average speed at which people walk is used for the moving speed, and, in other cases, a legitimate driving speed of transportation means such as a vehicle is used.

Next, the system control unit 33 acquires use time information showing a use time (duration) of each store determined in step S83 and step S84, from the store information database 323 (step S853). Meanwhile, for example, use time information associated with a store which sells a product is not registered in the database 323 in some cases, and, in these cases, common use time information (for example, ten minutes) set as default is acquired. Further, a configuration may be employed where use time information is acquired and set based on attribute information of the user. For example, when the sex is acquired as attribute information of the user, use time information indicating the use time (see FIG. 5) matching the sex is acquired and set.

Further, the system control unit 33 calculates an integration time by integrating the calculated moving time of the user, a use time (duration) indicated by the acquired or set use time information and a margin time set as default, and calculates a predicted time at a point of time when the integration time passes from the current time (step S854). In addition, the current time can be acquired by a clock function of the system control unit 33.

Next, the system control unit 33 decides whether or not the calculated predicted time is included within the vacant time zone of the user (step S86). Further, when the system control unit 33 decides that the predicted time is included within the vacant time zone of the user (step S86: YES), the step returns to step S84 to repeat the processing. Meanwhile, when deciding that the predicted time is not included within the vacant time zone of the user (step S86: NO), the system control unit 33 further determines a combination of stores determined in step S83 and step S84 as a combination of stores which the user can use within the vacant time range of the user indicated by the user time range information (step S87), and finishes store combination determining processing illustrated in FIG. 8 and the step returns to processing illustrated in FIG. 6. In addition, the store determined last in step S84 is excluded from the combination.

In addition, a configuration may be employed where the user specifies a use end time of the store within the vacant time range of the user, on the user specifying screen illustrated in FIG. 7 provided from the information providing server 3 to the potable terminal 1, and information indicating the specified end time is transmitted to the information providing server 3. In this case, the end time of the vacant time zone decided in step S86 is set in the end time specified by the user.

Next, the system control unit 33 acquires provision information associated with a store ID of each store in the determined combination and registered, from the provision information database 324, and transmits the acquired provision information to the potable terminal 1 which has sent the information acquisition request (step S8). In this case, information indicating the vacant time zone of the user and a transmission time of provision information is associated with the user ID of the user of the potable terminal 1 and stored in the storing unit 32.

In addition, a code (for example, two-dimensional code) including, for example, a corresponding store ID and a user ID of the user of the potable terminal 1 in data of each provision information transmitted to the potable terminal 1 is set.

Further, provision information of each store is transmitted together with order information indicating the order determined in, for example, step S83 and step S84 (that is, the order which the user uses).

Furthermore, a configuration may be employed where, when the acquired provision information is benefit information, the system control unit 33 selects benefit information matching card use information of the user of the potable terminal 1, from a plurality of pieces of benefit information registered per store to transmit to the potable terminal 1. This card use information can be, for example, acquired from use history information (registered in the user information database 321) associated with the user. For example, the system control unit 33 acquires a product ID of a product which the user purchased in the past by credit card payment, electronic money payment or coupon payment, from information related to payment included in this use history information, and selects benefit information associated with the product ID and registered (for example, indicating a benefit for discounting the product).

In addition, a configuration may be employed where each provision information is transmitted to the electronic mail address of the user.

Meanwhile, when receiving provision information transmitted from the information providing server 3, the control unit 16 of the potable terminal 1 stores the provision information in the storing unit 12 and displays the provision information on the display unit 15 (step S9). When the order information is received together with provision information, provision information of each store is displayed in a list format according to the order based on the order information (from the top to the bottom), or provision information of each store is sequentially switched (as a page is turned) and displayed according to the order based on the order information in response to a page turning operation by the user through the operation unit 14.

As described above, according to the operation of providing provision information from the information providing server 3 to the potable terminal 1, it is possible to flexibly provide provision information of a store matching a vacant time range of the user at which the store can be used, to the user. Further, even when the user cannot sufficiently secure a time to use a store, it is possible to flexibly provide provision information of a plurality of stores matching a time at which the user can secure to use the store, to the user. Furthermore, according to the providing operation, it is possible to determine a combination of stores which the user can use, based on a moving area, a purpose, a theme or a genre specified by the user, attribute information and use history information of the user and, consequently, it is possible to flexibly provide provision information of a store matching the vacant time range of the user according to the combination of stores matching user's preference. Still further, according to a configuration of determining a combination of a plurality of stores with a vacant time zone which at least partially overlaps the vacant time zone of the user, based on the vacant time zone of the store, it is possible to match the vacant time range of the user and the vacant time range of the store and flexibly provide provision information which is easier for the user to use.

Moreover, the user can check provision information of a plurality of stores matching the vacant time range of the user (for example, leisure time), and more sequentially and efficiently use each store. Further, when the provision information is benefit information, the user can get a benefit such as a discount upon payment for a product or service at a store, and promotes motivation of using a store, so that the store can attract more customers.

Modified Example

A configuration may be employed as another example in steps S1 to S3 where, when the user operates the operation unit 14 and registers a schedule during execution of the scheduler in the potable terminal 1 or at a timing when a vacant time range is searched for, the control unit 16 acquires user time range information satisfying predetermined conditions (for example, a plan is not made for two hours or more) specified by the user is acquired from the registered schedule information. In this case, when acquiring user time range information, the control unit 16 of the potable terminal 1 accesses and automatically logs in the information providing server 3 (by transmitting a user ID and a password set in the potable terminal 1 in advance, to the information providing server 3), and then transmits an information acquisition request including the user time range information to the information providing server 3 via the network NW. Further, processing (processing subsequent to step S6) in the information providing server 3 receiving the information acquisition request is the same as above. According to this configuration, when the user activates the scheduler or registers or updates a schedule, or at a timing when a vacant time range is searched for, it is possible to automatically transmit the information acquisition request to the information providing server 3. Consequently, it is possible to provide provision information of a store matching the vacant time range of the user in which the store can be used, to the user in a more timely manner.

Further, a configuration may be employed with another example where the control unit 16 detects that a predetermined period (for example, one month) or more passes (based on the current point of time) since a previous use of a specific store (for example, a hair salon specified by the user) set in advance by the scheduler. In this case, the control unit 16 acquires, for example, user time range information satisfying predetermined conditions (a plan is not made for two hours or more) specified by the user, from the registered schedule information at a timing when it is decided that a predetermined period or more passes, and transmits the user time range information and the information acquisition request including specific store information indicating a specific store set in advance by the scheduler, to the information providing server 3 via the network NW. Further, although the system control unit 33 of the information providing server 3 which receives the information acquisition request performs processing subsequent to step S6, a store indicated by specific store information included in the information providing request is determined as a departure store in step S83. By this means, although it is possible to determine a combination of stores including a store for which a predetermined period passes since the previous use, the user can use the store in the vacant time range of the user even if the user forgets using the store next time.

In addition, a configuration may be employed where, when a schedule is registered or updated, when the vacant time range is voluntarily searched for, or at a timing when it is detected that a predetermined period or more passes, the potable terminal 1 acquires registered schedule information and transmits an information acquisition request including the schedule information, to the information providing server 3 via the network NW. In this case, the information providing server 3 acquires user time range information satisfying predetermined conditions (a plan is not made for two hours or more) from the acquired schedule information (when a specific store is set by the scheduler, specific store information indicating the store is also acquired). Further, a configuration may be employed with this modified example where the potable terminal 1 includes position information of the user indicating the current position detected by the GPS receiver 13, in the information acquisition request to transmit to the information providing server 3. Furthermore, a configuration may be employed where, if area information or use condition information is set or stored in advance, the potable terminal 1 includes these pieces of information in an information acquisition request to transmit to the information providing server 3.

(2.2 Operation of Updating Provision Information from Information Providing Server 3 to Mobile Terminal 1)

Next, an operation of updating provision information from the information providing server 3 to the potable terminal 1 will be described using FIG. 10.

Figure 10:
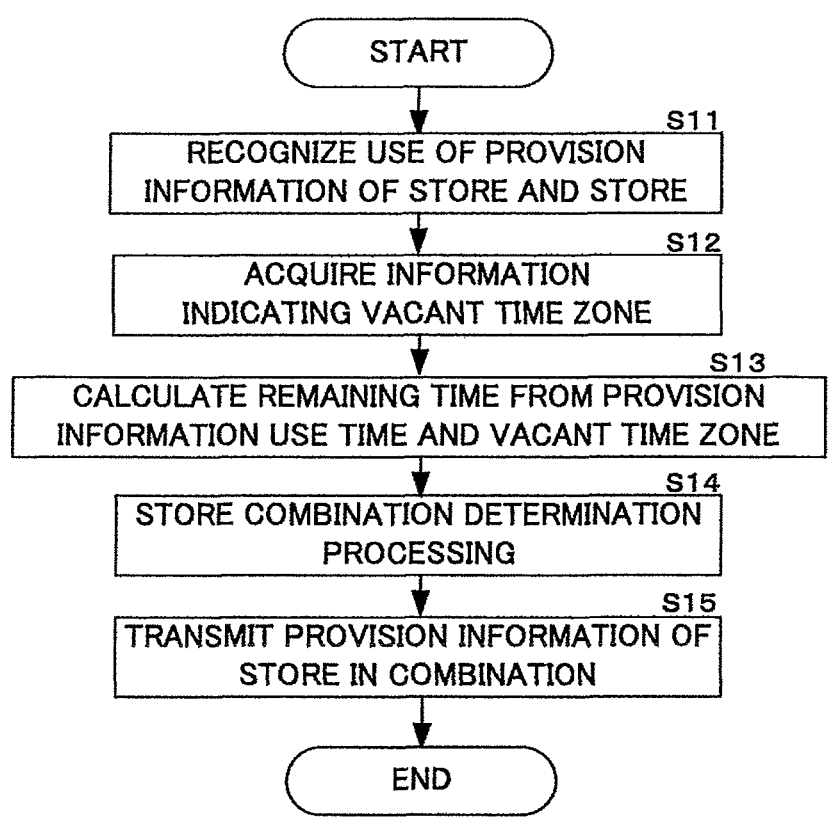
FIG. 10 is a flowchart illustrating processing of updating provision information in the system control unit 33 of the information providing server 3.

FIG. 10 is a flowchart illustrating processing of updating provision information in the system control unit 33 of the information providing server 3.

The preconditions of processing illustrated in FIG. 10 are that the user which acquires provision information from the information providing server 3 by means of the potable terminal 1 according to the operation of providing the provision information, can visit a store indicated by the provision information and purchases a product or gets service at the store. When using benefit information upon payment, the user can, for example, purchase a product at a price discounted from a sales price of a product at a discount rate indicated by benefit information. In this case, the user selects operates the operation unit 14 of the potable terminal 1, selects provision information of a desired store and displays a two-dimensional code included in the provision information, on the display unit 15. Further, this two-dimensional code is read by a code reader connected to the store terminal 2 when a store staff operates the store terminal 2, and is acquired by the store terminal 2. Furthermore, the store terminal 2 extracts, for example, a store ID and a user ID from the read two-dimensional code.

In addition, when the user prints provision information stored in the storing unit 12 of the potable terminal 1 at home and carries it to the store, the two-dimensional code displayed in the provision information may be read by the code reader connected to the store terminal 2, and acquired by the store terminal 2. Further, instead of a two-dimensional code, a barcode or an electronic watermark may be displayed on a coupon, read by a reader and acquired by the store terminal 2. Furthermore, a configuration may be employed where a store ID and a user ID included in provision information of a store are transmitted from a non-contact IC chip (a known FeliCa (registered trademark) technique is adopted) mounted on the potable telephone 1 to a non-contact reader/writer connected to the store terminal 2 by way of non-contact communication, and acquired by the store terminal 2.

Still further, a sales price of a product of a purchasing target is inputted at the store by a staff from the store terminal 2. Moreover, when the user purchases by, for example, credit card payment, the user passes the credit card of the user to a store staff. Further, a credit card number is read from a credit card by a card reader connected to the store terminal 2 according to an operation of the store terminal 2 by the store staff, and acquired by the store terminal 2. Furthermore, when the store staff operates the store terminal 2 and commands payment, the store terminal 2 accesses the information providing server 3 via the network NW. Still further, the store terminal 2 includes a payment request including information such as the acquired user ID, store ID, inputted sales price and credit card number, to the information providing server 3 via the network NW. In addition, the sales price is a price discounted at a discount rate indicated by benefit information when the provision information is benefit information (the price may be discounted by the information providing server 3). Further, instead of a sales price of a product, the product ID of the product may be included in a payment request, and the information providing server 3 may specify the sales price using the product ID as a key. Furthermore, without including a user ID in a payment request, the information providing server 3 may specify a user ID as a credit card number included in the payment request, from the user information database 321.

Meanwhile, when receiving the payment request, the information providing server 3 sends an authorization request to a credit system of a credit card company through, for example, a dedicated line. The credit system of the credit card company checks validity of a credit card and checks up a card credit balance, and returns the authorization result to the information providing server 3. Further, when acquiring the returned authorization result, the system control unit 33 of the information providing server 3 decides whether or not the authorization result is good, and executes credit card payment processing when the authorization result is good. Subsequently, the system control unit 33 associates the use history information and the user ID to register in the user information database 321, and starts processing illustrated in FIG. 10.

With processing illustrated in FIG. 10, the system control unit 33 first acquires the store ID and the user ID from the received payment request to recognize use of provision information of a store associated with the store ID (a use flag is set), and stores the current time as provision information use time in association with the acquired user ID (step S11). In addition, the system control unit 33 may recognize reception of the authorization result which is good, as use of provision information. Further, a configuration may be employed where, in addition to that provision information updating processing is started under conditions that credit card payment is executed (in other words, an authorization result is good), provision information updating processing illustrated in FIG. 10 is started under conditions that, for example, electronic money payment or coupon payment is executed. In case of online electronic money payment, a store terminal transmits information indicating electronic money payment (including a user ID and a store ID) to the information providing server 3 upon electronic money payment. Meanwhile, in case of offline electronic money payment, when synchronization is established with the information providing server 3 (for example, per predetermined time by batch processing) after the store terminal executes electronic money payment, information indicating electronic money payment (including a user ID and a store ID) is transmitted to the information providing server 3. Further, the system control unit 33 of the information providing server 3 acquires the store ID and the user ID from the received information indicating electronic money payment, and perform processing subsequent to step S11.

Meanwhile, in case of coupon payment, the store terminal transmits information indicating coupon payment (including a user ID and a store ID), to the information providing server 3 upon coupon payment or after coupon payment. Further, the system control unit 33 of the information providing server 3, for example, acquires the store ID and the user ID from the received information indicating coupon payment, and perform processing subsequent to step S11. In addition, a coupon used upon coupon payment includes benefit information received by the potable terminal 1 from the information providing server 3 in step S9 and, in addition, an electronic coupon which the user acquires from a Web site which provides store information, using a user terminal such as the potable terminal 1. This electronic coupon is assigned a unique coupon ID in some cases and, in these cases, a user ID and a coupon ID of a user to which an electronic coupon is delivered are associated and registered in a server. Consequently, when the user uses an electronic coupon at a store, the information providing server 3 can specify the user ID of the user using the electronic coupon.

Next, the system control unit 33 acquires information associated with the acquired user ID, stored and indicating a vacant time zone of the user, from the storing unit 32 (step S12). Next, the system control unit 33 calculates a remaining time from the stored provision information use time (recognized use time) and the acquired vacant time zone (step S13). When, for example, the vacant time zone of the user is 12:00 to 15:00 and provision information use time is 13:00, a remaining time is two hours.

Next, the system control unit 33 performs store combination determining processing of redetermining a combination of stores which the user can use within the calculated remaining time (step S14). The above-described processing illustrated in FIG. 8 is applied to this store combination determining processing. Meanwhile, with this store combination determining processing, the system control unit 33 newly specifies a vacant time zone of the user matching the calculated remaining time in step S71, and selects a plurality of stores which the user can use within the vacant time zone, from the store information database 323. Further, the current position of the user fluctuates from upon reception of the information acquisition request in step S5, and therefore the system control unit 33 acquires position information of the user from the potable terminal 1 again and uses position information in processing illustrated in FIG. 8. In addition, a configuration may be employed where position information of the store at which payment processing is executed is used for position information of the potable terminal 1. A configuration may be employed where, also in this step S14, the system control unit 33 selects a plurality of stores with a vacant time zone which at least partially overlaps a vacant time zone of the user, from the store information database 323 based on the vacant time zone of the user (newly specified as described above) and the vacant time zone of the store specified by newly referring to the store information database 323. Upon store combination determining processing in this step S14, the vacant time zone of the store is likely to be changed from previous store combination determining processing. Consequently, by determining a combination of a plurality of stores with a vacant time zone which at least partially overlaps a vacant time zone of the user based on the vacant time zone of the user and the vacant time zone of the store in store combination determining processing in step S14, it is possible to more effectively match the vacant time zone of the user and the vacant time zone of the store, and flexibly provide provision information which is more easy for the user to use.

Further, the system control unit 33 acquires provision information associated with a store ID of each store in the redetermined combination and registered, from the provision information database 324, and transmits the acquired provision information to the potable terminal 1 similar to step S8 (step S15). In this case, content of provision information acquired from the provision information database 324 and transmitted to the potable terminal 1 is updated from provision information transmitted in step S8. That is, when a time passes more since transmission of the first provision information, the situation such as the current position of the user changes, and therefore content of the provision information changes.

As described above, according to the operation of updating provision information from the information providing server 3 to the potable terminal 1, the information providing server 3 redetermines a combination of stores which the user can use within the remaining time in the vacant time zone of the user after a predetermined time passes (for example, at a timing of calculating the remaining time) since transmission of the first provision information, and transmits provision information of the store in the redetermined combination, to the potable terminal 1. Consequently, even when the user uses one or more stores of provision information, time then passes and the situation such as the current position of the user changes, it is possible to more flexibly provide provision information of a store matching the remaining time, to the user.

In addition, a configuration may be employed where a combination of stores is redetermined on a regular basis at predetermined time intervals since transmission of the first provision information and the provision information is transmitted to the potable terminal 1 or to the electronic mail address of the user.

Figure 9:
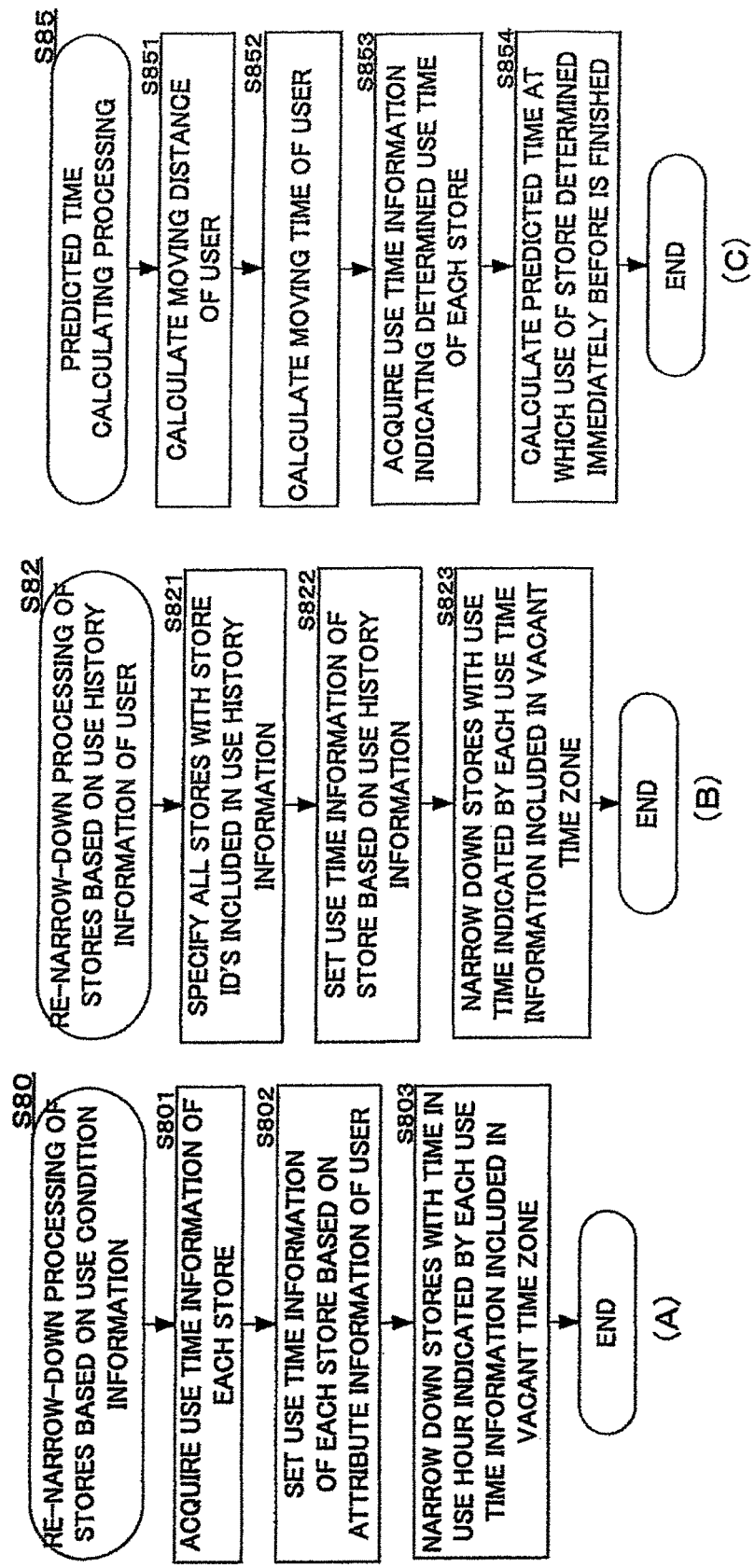
FIG. 9(A) is a flowchart illustrating an example of re-narrow-down processing in step S80 in shown FIG. 8.
FIG. 9(B) is a flowchart illustrating an example of re-narrow-down processing in step S82 in shown FIG. 8.
FIG. 9(C) is a flowchart illustrating an example of predicted time calculating processing in step S85.

Further, although a configuration has been employed with the above embodiment where the information providing server 3 performs processings illustrated in FIGS. 8 to 10, a configuration may be employed with another example where the potable terminal 1 performs processings illustrated in FIGS. 8 to 10. In this case, the control unit 16 of the potable terminal 1 functions as store information acquiring means according to the present invention to acquire all or part of information registered in the store information database 323 and the provision information database 324, from the information providing server 3 via the network NW to store in the storing unit 12. Next, the control unit 16 of the potable terminal 1 functions as time range information acquiring means and store combination determining means according to the present invention to perform the processings illustrated in FIGS. 8 to 10. Further, the control unit 16 of the potable terminal 1 functions as display control means that displays provision information of a store according to the present invention to acquire provision information associated with a store ID of each store in the determined combination and registered, from the storing unit 12 (similar to step S8), and displays the acquired provision information on the display unit 15 (similar to step S9).

EXPLANATION OF REFERENCE NUMERALS

1 Portable terminal
2 Store terminal
3 Information providing server
11 Communication unit
12 Storing unit
13 GPS receiver
14 Operation unit
15 Display unit
16 Control unit
31 Communication unit
32 Storing unit
33 System control unit
NW Network
S Information providing system

The invention claimed is:

1. A server apparatus to which a store terminal of a store is accessible via a communication network, comprising:
   at least one memory operable to store code;
   at least one processor operable to read said code and operate as instructed by said code, said code including:
      store information storing code that causes the at least one processor to store, in a store information storage, store information that is uploaded by the store terminal of each store via the communication network, the store information of the store including use time information of the store that includes time zones in which a product or a service is available to the user according to different attributes of the user, wherein the store information storage further stores, per store, provision information related to a product or a service provided by each of the stores;

time range information acquiring code that causes the at least one processor to acquire user time range information indicating a vacant time range of a user;

attribute information acquiring code that causes the at least one processor to acquire attribute information of the user indicating at least one attribute of the user, the at least one attribute including at least one of an age and a gender of the user;

use time information acquiring code that causes the at least one processor to acquire use time information, which is determined according to the attribute information of the user, by referring to the store information storage which stores the store information including the use time information;

store combination determining code that causes the at least one processor to determine a combination of stores which the user can use within the vacant time range indicated by the user time range information based on the acquired use time information, the acquired attribute information of the user, and the acquired user time range information; and provision information transmitting code that causes the at least one processor to transmit the provision information of the stores in the determined combination, to a terminal device of the user via the communication network.

2. The server apparatus according to claim 1, wherein the store information storage further stores store time range information indicating a vacant time range of the store, and the store combination determining code causes the at least one processor to determine the combination of the stores having the vacant time range of the store which at least partially overlaps the vacant time range of the user, based on the vacant time range of the user indicated by the acquired user time range information and the vacant time range of the store indicated by the store time range information.

3. The server apparatus according to claim 2, further comprising:

use history information acquiring code that causes the at least one processor to acquire a past use time in which the user used the store in a past, wherein the use time information acquiring code causes the at least one processor to acquire the use time information of the stores, based on the attribute information and the acquired past use time.

4. The server apparatus according to claim 2, further comprising schedule information acquiring code that causes the at least one processor to acquire schedule information of the user by using an application for managing the schedule information of the user, wherein, when it is determined that there is no scheduled activity for a certain time period from the acquired schedule information, the time range information acquiring code causes the at least one processor to acquire the user time range information as the certain time period.

5. The server apparatus according to claim 2, wherein the store information further includes position information of the stores, and the server apparatus further comprises:

position information acquiring code that causes the at least one processor to acquire position information of the user from the terminal device, wherein the store combination determining code causes the at least one processor to determine the combination of the stores which the user can use within the vacant time range of the user, based on the acquired user time range information, the acquired position information of the user and the position information of the stores.

6. The server apparatus according to claim 2, wherein the store information further includes position information of the stores, and the server apparatus further comprises:

area information acquiring code that causes the at least one processor to acquire area information indicating an area in which the user moves, wherein the store combination determining code causes the at least one processor to determine the combination of the stores which the user can use within the vacant time range of the user, based on the acquired user time range information, the acquired area information and the position information of the stores.

7. The server apparatus according to claim 2, wherein the store information further includes attribute information of the stores, and the server apparatus further comprises:

use condition information acquiring code that causes the at least one processor to acquire use condition information comprising at least one of a purpose, a theme and a genre in which the user uses a plurality of stores, wherein the store combination determining code causes the at least one processor to determine the stores matching at least one of the purpose, the theme and the genre indicated in the use condition information as the stores included in the combination, based on the acquired use condition information and the attribute information of the stores.

8. The server apparatus according to claim 2, further comprising departure store information acquiring code that causes the at least one processor to acquire departure store information indicating a store which the user wishes to use first within the vacant time range of the user, wherein the store combination determining code causes the at least one processor to determine the combination of the stores including the store indicated by the acquired departure store information as a departure store.

9. The server apparatus according to claim 2, wherein the store combination determining code causes the at least one processor to redetermine a combination of the stores which the user can use within a remaining time of the vacant time range of the user after a certain time passes, and the provision information transmitting code causes the at least one processor to transmit provision information of the stores in the redetermined combination, to the terminal device of the user.

10. The server apparatus according to claim 9, further comprising:

use recognizing code that causes the at least one processor to recognize use of the provision information of the stores in the determined combination; and remaining time calculating code that causes the at least one processor to calculate the remaining time based on the recognized use time and the vacant time range of the user, wherein the store combination determining code causes the at least one processor to redetermine the combination of the stores which the user can use within the remaining time at a timing of calculating the remaining time.

11. The server apparatus according to claim 2, wherein the provision information further includes benefit information indicating a benefit which the user gets from the stores.

12. The server apparatus according to claim 1, further comprising:
use history information acquiring code that causes the at least one processor to acquire a past use time in which the user used the store in a past, wherein
the use time information acquiring code causes the at least one processor to acquire the use time information of the stores, based on the attribute information and the acquired past use time.

13. The server apparatus according to claim 1, further comprising schedule information acquiring code that causes the at least one processor to acquire schedule information of the user by using an application for managing the schedule information of the user,
wherein, when it is determined that there is no scheduled activity for a certain time period from the acquired schedule information, the time range information acquiring code causes the at least one processor to acquire the user time range information as the certain time period.

14. The server apparatus according to claim 1, wherein the store information further includes position information of the stores, and the server apparatus further comprises:
position information acquiring code that causes the at least one processor to acquire position information of the user from the terminal device,
wherein the store combination determining code causes the at least one processor to determine the combination of the stores which the user can use within the vacant time range of the user, based on the acquired user time range information, the acquired position information of the user and the position information of the stores.

15. The server apparatus according to claim 1, wherein the store information further includes position information of the stores, and the server apparatus further comprises:
area information acquiring code that causes the at least one processor to acquire area information indicating an area in which the user moves,
wherein the store combination determining code causes the at least one processor to determine the combination of the stores which the user can use within the vacant time range of the user, based on the acquired user time range information, the acquired area information and the position information of the stores.

16. The server apparatus according to claim 1, wherein the store information further includes attribute information of the stores, and the server apparatus further comprises:
use condition information acquiring code that causes the at least one processor to acquire use condition information comprising at least one of a purpose, a theme and a genre in which the user uses a plurality of stores,
wherein the store combination determining code causes the at least one processor to determine the stores matching at least one of the purpose, the theme and the genre indicated in the use condition information as the stores included in the combination, based on the acquired use condition information and the attribute information of the stores.

17. The server apparatus according to claim 1, further comprising departure store information acquiring code that causes the at least one processor to acquire departure store information indicating a store which the user wishes to use first within the vacant time range of the user,
wherein the store combination determining code causes the at least one processor to determine the combination of the stores including the store indicated by the acquired departure store information as a departure store.

18. The server apparatus according to claim 1, wherein the store combination determining code causes the at least one processor to redetermine a combination of the stores which the user can use within a remaining time of the vacant time range of the user after a certain time passes, and
the provision information transmitting code causes the at least one processor to transmit provision information of the stores in the redetermined combination, to the terminal device of the user.

19. The server apparatus according to claim 18, further comprising:
use recognizing code that causes the at least one processor to recognize use of the provision information of the stores in the determined combination; and
remaining time calculating code that causes the at least one processor to calculate the remaining time based on the recognized use time and the vacant time range of the user,
wherein the store combination determining code causes the at least one processor to redetermine the combination of the stores which the user can use within the remaining time at a timing of calculating the remaining time.

20. The server apparatus according to claim 1, wherein the provision information further includes benefit information indicating a benefit which the user gets from the stores.

21. An information providing method in a server apparatus to which a store terminal of a store is accessible via a communication network, comprising:
a step of, at the server apparatus, storing, in a store information storage, store information that is uploaded by the store terminal of each store via Internet network, the store information including use time information of the store that includes time zones in which a product or a service is available to the user according to different attributes of the user, wherein the store information storage further stores, per store, provision information related to a product or a service provided by each of the stores;
a step of, at the server apparatus, acquiring user time range information indicating a vacant time range of a user;
a step of, at the server apparatus, acquiring attribute information of the user indicating at least one attribute of the user, the at least one attribute including at least one of an age and a gender of the user;
a step of, at the server apparatus, acquiring use time information, which is determined according to the attribute information of the user by referring to the store information storage which stores the store information including the use time information;
a step of, at the sever apparatus, determining a combination of stores which the user can use within the vacant time range indicated by the user time range information based on the acquired use time information, the acquired attribute information of the user, and the acquired user time range information; and a step of, at the server apparatus, transmitting the provision information of the stores in the determined combination, to a terminal device of the user via the communication network.

22. An information providing system comprising a store terminal of a store and a server apparatus to which the store terminal is accessible via a communication network, the server comprising:

at least one memory operable to store code;

at least one processor operable to read said code and operate as instructed by said code, said code including:

store information storing code that causes the at least one processor to store, in a store information storage, store information that is uploaded by store terminal of each store via the communication network, the store information of the store including use time information of the store that includes time zones in which a product or a service is available to the user according to different attributes of the user, wherein the store information storage further stores, per store, provision information related to a product or a service provided by each of the stores;

attribute information acquiring code that causes the at least one processor to acquire attribute information of a user indicating at least one attribute of the user, the at least one attribute including at least one of an age and a gender of the user;

time range information acquiring code that causes the at least one processor to acquire user time range information indicating a vacant time range of the user;

use time information acquiring code that causes the at least one processor to acquire use time information, which is determined according to the attribute information of the user by referring to the store information storage which stores the store information;

store combination determining code that causes the at least one processor to determine a combination of the stores which the user can use within the vacant time range indicated by the user time range information, based on the acquired use time information, the acquired attribute information of the user, and the acquired user time range information; and display control code that causes the at least one processor to control to display provision information of the stores in the determined combination on a terminal device of the user through the communication network.

23. A server apparatus to which a store terminal of a store is accessible via a communication network, comprising:

at least one memory operable to store code;

at least one processor operable to read said code and operate as instructed by said code, said code including:

time range information acquiring code that causes the at least one processor to acquire user time range information indicating a vacant time range of a user;

store combination determining code that causes the at least one processor to determine a combination of stores which the user can use within the vacant time range indicated by the user time range information based on store information of each of stores which provide a product or service and the acquired user time range information, wherein the store information includes at least any one of position information of the stores, use time information of the stores, and attribute information of the stores, and wherein the store information is uploaded by the store terminal of each store via the communication network;

provision information transmitting code that causes the at least one processor to transmit provision information of the stores in the determined combination, to a terminal device of the user via the communication network, the provision information being related to a product or a service provided by each of the stores;

use recognizing code that causes the at least one processor to recognize use of the provision information of the stores in the determined combination; and remaining time calculating code that causes the at least one processor to calculate a remaining time in the vacant time range based on the recognized use time and the vacant time range, wherein the store combination determining code causes the at least one processor to redetermine the combination of the stores which the user can use within the remaining time at a timing of calculating the remaining time, and wherein the provision information transmitting code causes the at least one processor to retransmit provision information of the stores in the redetermined combination, to the terminal device of the user via the communication network.

24. An information providing method in a server apparatus to which a store terminal of a store is accessible via a communication network, comprising:

a step of, at the server apparatus, acquiring user time range information indicating a vacant time range of a user;

a step of, at the sever apparatus, determining a combination of stores which the user can use within a vacant time range indicated by the user time range information based on store information of each of stores which provide a product or service and the acquired user time range information, wherein the store information includes at least any one of position information of the stores, use time information of the stores, and attribute information of the stores, and wherein the store information is uploaded by the store terminal of each store via the communication network;

a step of, at the server apparatus, transmitting provision information of the stores in the determined combination, to a terminal device of the user via the communication network, the provision information being related to a product or a service provided by each of the stores;

a step of, at the server apparatus, recognizing use of the provision information of the stores in the determined combination;

a step of, at the server apparatus, calculating a remaining time in the vacant time range based on the recognized use time and die vacant time range;

a step of, at the server apparatus, redetermining the combination of the stores which the user can use within the remaining time at a timing of calculating the remaining time; and a step of, at the server apparatus, retransmitting provision information of the stores in the redetermined combination, to the terminal device of the user via the communication network.

* * * * *